March 29, 1927.

W. RAYMOND

MAGNETICALLY CONTROLLED FLUID VALVE

Filed May 3, 1926

1,622,672

INVENTOR
Ward Raymond
BY
Joseph N. Schofield
ATTORNEY

Patented Mar. 29, 1927.

1,622,672

UNITED STATES PATENT OFFICE.

WARD RAYMOND, OF EASTON, PENNSYLVANIA, ASSIGNOR TO PENNSYLVANIA PUMP & COMPRESSOR COMPANY, OF EASTON, PENNSYLVANIA, A CORPORATION OF PENNSYLVANIA.

MAGNETICALLY-CONTROLLED FLUID VALVE.

Application filed May 3, 1926. Serial No. 106,302.

This invention relates to magnetically controlled fluid valves and particularly to a pilot valve of this type adapted to control the unloading of a compressor or pump.

An object of the present invention is to provide a magnetically controlled valve having a solenoid or armature operating within a closed pressure tight tube, movement of the solenoid being adapted to control the movement of the pilot valve to which it is attached.

Another object of the invention is to provide the pressure tight tube of non-conducting material so that there will be little or no heating effect due to eddy currents within said tube.

Another object of the invention is to form the armature of laminations to reduce or eliminate the eddy currents and their heating effect.

One feature which is advantageous, also, is that the valve opened and closed by movement of the armature or solenoid is resiliently held relative to the armature so that when operated by alternating current, there will be no humming or chattering of the valve.

Another advantage of the construction is that a limited amount of movement of the valve relative to the armature is permitted so that when the armature is moved, the valve is forced by the resultant blow to either open or closed position.

Another object of the invention is to provide an exhaust valve opened and closed by movement of the armature, this exhaust valve being opened when the pilot valve is closed and closed when the pilot valve is opened.

With the above and other objects in view, my invention consists in the features of construction and operation set forth in the following specification and illustrated in the accompanying drawings.

In the accompanying drawings annexed hereto and forming a part of this specification, I have shown my invention embodied in an electric motor driven compressor but it will be understood that the invention can be otherwise embodied and that the drawings are not to be construed as defining or limiting the scope of the invention, the claims appended to this specification being relied upon for that purpose.

Figure 1:
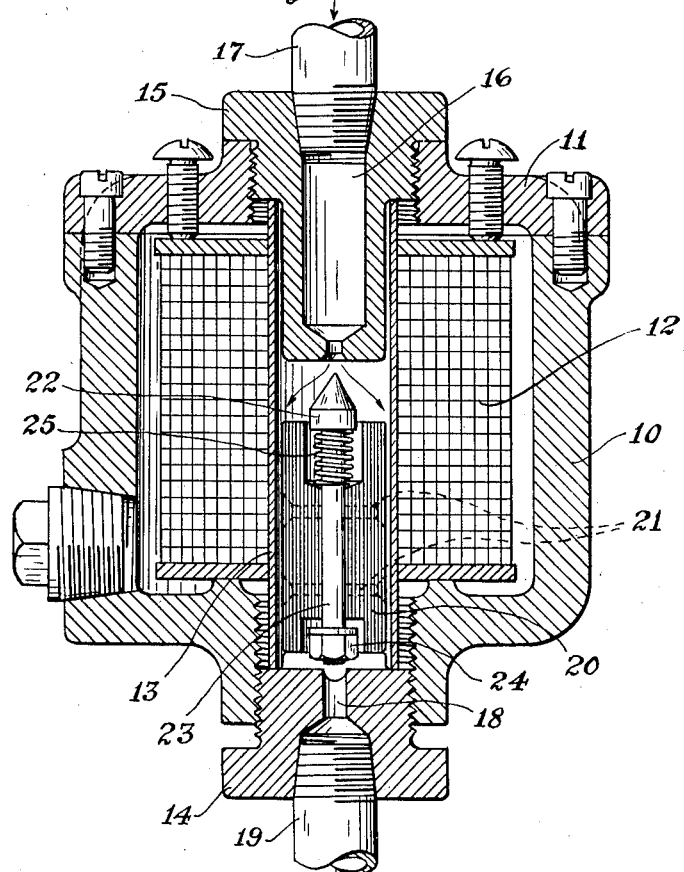
Figure 1 is a central-sectional view through one form of my improved valve.

In the above mentioned drawings, I have shown but two embodiments of the invention which are now deemed preferable, but it is to be understood that changes and modifications may be made within the scope of the appended claims without departing from the spirit of the invention.

Briefly, and in its broadest aspect, my invention comprises the following principal parts: first, a body member; second, a coil winding therein; third, a pressure tight tube within the body member; fourth, an armature movable within said tube; fifth, a valve mounted on said armature; and sixth, connections leading from said tube to a compressor receiver and an unloader device.

Referring more in particular to the figures of the drawing, I provide a body member or casing 10 preferably provided at one end with a cover plate 11. Within this casing 10 is an electro-magnet coil winding 12, the terminals of which are connected with the circuit for operating the motor driving the compressor in the usual manner. When the compressor is operating normally, current flows through the coil 12. Centrally mounted within the casing 10 is a pressure tight tube 13 surrounded throughout the major part of its length by the coil 12. Closing the bottom of the casing and engaging the lower end of the tube 13 is a plug 14. The upper end of the tube 13 is engaged by a plug 15 inserted within the cover plate 11. By adjustment of these plugs 14 and 15, as by the screw threads shown, the tube 13 is retained in position and maintained substantially pressure tight relative to the plugs 14 and 15.

Extending through the plug 15 is a conduit 16 leading into the tube 13. Plug 15 also is adapted to have attached to it a pipe 17 leading to a compressor receiver (not shown). The plug 14 is provided with a conduit 18 also leading into the tube 13. Adapted to be connected to the plug 14 is a pipe 19 extending to the unloader devices attached to the compressors. As these unloader devices may be of any well known or standard construction, it is not thought necessary to describe them, it will suffice to state that when fluid under pressure is admitted into the pipe 19, the unloader devices are operated to partially or completely unload the compressor.

Within the pressure tight tube 13 is an armature 20 formed, as shown, by a number of thin sheets of magnetic material such as iron or steel secured together as by rivets 21. During normal operation of the compressor or pump to which the value is attached, the armature is held in its upper position by the flux produced by the current within the coil 12. This causes a small pointed valve 22 to press firmly against the lower end of the plug 15 thus effectively closing the conduit 16 and preventing any fluid under pressure passing through the tube 13 and into conduit 19 to the unloader devices. Without current in the coil 12, the armature drops to the position shown in Fig. 1 due to its weight, this movement carrying the valve 22 with it to open the conduit 16 and supply fluid under receiver pressure to the unloader devices.

As shown in Fig. 1, the valve 22 is flexibly attached to the armature 20 by the rod 23, a nut 24 being provided on the lower end of the rod 23. Between the upper end of the armature 20 and the valve 22 is a spring 25 preferably surrounding the rod 23. By these means the valve 22 is resiliently held in its upper and closing position, due to the lost motion between the armature 20 and rod 23, the armature 20 drops an appreciable distance before the valve 22 moves from it seat. In this way the valve 22 is struck a slight blow by contact between the armature 20 and nut 24.

Figure 2:
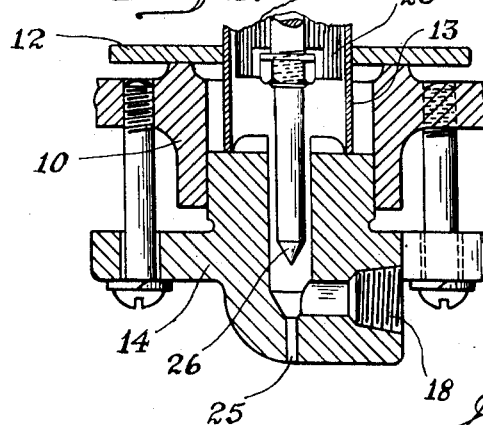
Fig. 2 is a similar view of a portion of a slightly modified form of valve.

In Fig. 2 a slight modification of the invention is shown in which an exhaust port 25 is provided through which the fluid may be released when the valve 22 moves upward. In this form of the invention, the lower end of the rod 23 is pointed to form a valve 26 to open and close the port 25. It will be seen from this construction that with the armature in its upper or unloading position, the port 25 will be open to atmosphere thus allowing the fluid within the conduit 25 leading to the unloader devices to be exhausted. Movement downward of the armature 20 and valve 22 to unload the compressor closes the valve 25 simultaneously with the opening of conduit 16 by valve 22. Fluid from the compressor receiver can then enter the tube 13 and pass directly into conduit 19 to the unloader devices.

In making the tube 13 I prefer to form it of non-metallic and non-conducting material such as fibre, glass or rubber. By forming the tube 13 of this material, a substantially pressure tight opening may be provided through the body member for the fluid operating the unloader. Also any heating effect due to the electrical conditions will be eliminated and the armature will be actuated with a powerful magnetic force.

What I claim is:

1. A magnetically controlled valve comprising in combination, a body member, an electromagnetic coil therein, a pressure tight tube of non-conducting material within said coil, a fluid conduit directly connected to the interior of said tube in fluid tight relation thereto, an armature within said tube, and a valve on said armature adapted to open and close said fluid conduit, said armature and valve being forced in one direction when said coil is energized.

2. A magnetically controlled valve comprising in combination, a body member, an electromagnetic coil therein, a pressure tight tube of non-conducting material within said coil, a fluid conduit directly connected to the interior of said tube in fluid tight relation thereto, an armature within said tube comprising a number of laminations of magnetic material secured longitudinally together, and a valve on said armature axially movable relative thereto whereby movement of said armature will move said valve to its open or closed position.

3. A magnetically controlled valve comprising in combination, a body member, an electro-magnetic coil therein, a tube within said coil, caps closing the ends of said tube and having openings therethrough, a fluid conduit directly connected to said tube and caps, an armature within said tube, and a valve resiliently mounted on said armature whereby movement of said armature will move said valve to its open and closed position.

4. A magnetically controlled valve comprising in combination, a body member, an electro-magnetic coil therein, a tube within said coil, caps closing the ends of said tube and having openings therethrough, a fluid conduit directly connected to said tube and caps, an armature within said tube, a valve resiliently mounted on said armature, a release valve on the opposite end of said armature, whereby movement of said armature between the caps will open and close said valves relative to said conduits.

5. A magnetically controlled valve comprising in combination, a body member, an electromagnetic coil therein, a pressure tight tube within said coil of non-conducting material, a fluid conduit directly connected to said tube and in pressure tight relation thereto, an armature within said tube, and a valve axially movable on said armature and resiliently mounted thereon whereby movement of said armature in one direction will force said valve firmly into its closed position.

In testimony whereof, I hereto affix my signature.

WARD RAYMOND.